United States Patent [19]

Hagihara et al.

[11] Patent Number: 5,587,808
[45] Date of Patent: Dec. 24, 1996

[54] IMAGE PROCESSING APPARATUS FOR IDENTIFYING CHARACTER, PHOTO AND DOT IMAGES IN IMAGE AREA

[75] Inventors: Hayato Hagihara; Takahiro Hongu, both of Tokyo, Japan

[73] Assignee: NEC Corporation, Tokyo, Japan

[21] Appl. No.: 455,623

[22] Filed: May 31, 1995

[30] Foreign Application Priority Data

May 31, 1994 [JP] Japan .................................. 6-117768
[51] Int. Cl.$^6$ .............................. H04N 1/40; H04N 1/38
[52] U.S. Cl. ........................ 358/462; 358/464; 382/176
[58] Field of Search .................................. 358/462, 464; 382/176

[56] References Cited

U.S. PATENT DOCUMENTS

4,547,811  10/1985  Ochi et al. ............................. 358/280
5,177,795   1/1993  Tanioka et al. ......................... 358/462

*Primary Examiner*—Edward L. Coles, Sr.
*Assistant Examiner*—Tia M. Harris
*Attorney, Agent, or Firm*—Foley & Lardner

[57] ABSTRACT

An image processing device according to the present invention comprises a picture element extraction circuit for extracting picture signals in a matrix area composed of picture signals corresponding to density of pixels of an image, a first area determination circuit for determining whether the image in the matrix area is in a photo area or a provisional character area, a second area determination circuit for determining whether or not the image is a dot image, and a third area determination circuit. The first area determination circuit determines whether the matrix area is the provisional character area or the photo area based on the maximum and minimum values of picture signals in the matrix area. The second area determination circuit detects a continuous edge from picture signals of picture elements in the primary scanning direction and the secondary scanning direction in the matrix area. When the continuous edge is detected either in the primary or secondary scanning direction, the second area determination circuit determines the matrix area to be a character area. When it is not detected, the circuit determines the matrix area to an area other than the character area. The third area determination circuit detects plurality of the results of determination by the first and second area determination circuits, and determines finally whether the matrix area is a character area or another area based on the results of determination.

4 Claims, 6 Drawing Sheets

| P(i-1, j-1) | P(i-1, j) |
|---|---|
| P(i, j-1) | P(i, j) |

→ PRIMARY SCANNING DIRECTION

SECONDARY SCANNING DIRECTION ↓

| Bi-1,j-1 | Bi-1,j | Bi-1,j+1 |
|---|---|---|
| Bi,j-1 | Bi,j | |

IMAGE PROCESSING APPARATUS FOR IDENTIFYING CHARACTER, PHOTO AND DOT IMAGES IN IMAGE AREA

BACKGROUND OF THE INVENTION

1. Field of the Invention

The present invention relates to an image processing device for determining an image area in which character, photo, and dot images are mixed, and, more particularly, to an improvement in the device for accurately determining whether an image is a character image or another type of image.

1. Description of the Prior Art

In general, a facsimile device or a phototelegraphic device uses an image processing device for generating a pictorial signal by scanning a document in which photo images, character images, and dot images are mixed, converting it to binary signal 0 or 1, and coding them. However, in the process of binary signal conversion, if the image is converted to binary signal 0 or 1 in exactly the same way regardless of the type of image, the coding efficiency drops and image reproducibility deteriorates. Thus, the conventional image processing device solves such problem by determining the type of image, and generating binary signals with methods suitable for the respective images.

In relation to the image processing technique for determining the type of image, U.S. Pat. No. 4,547,811 discloses a method for distinguishing a binary image from an image with gray levels, such as a photograph. The method performs the following determination by dividing a document into blocks each composed of m x n picture elements or pixels, detecting the maximum density level $L_{max}$ and the minimum density level $L_{min}$ of picture signal levels in the blocks, and comparing them with a reference value P.

i) The image in a block is a character image if $$L_{max}-L_{min}>P,$$

and ii) The image in a block is a photo image if $$L_{max}-L_{min} \leq P.$$

However, while the above method is effective in distinguishing a photo image whose density level continuously varies and a character image, it is not effective in distinguishing a dot image like a mesh pattern and a character image.

As an alternative image processing technique, there is a method which utilizes the characteristic that a character image has a larger differential amount or density difference at the boundary, and determines an image to be a character image if the differential amount is large, and not to be a character image in other cases. However, because the differential amount is large at a boundary not only of a character but also of a dot in a dot image, there is a higher possibility for a dot image to be determined to be a character image.

If a dot image is determined to be a character image and its picture signal is converted to binary signals in a binary conversion rule of suitable for the character image, the reproducibility of the dot image deteriorates, and the reproduced image becomes rather dark and obscure.

In addition, U.S. application Ser. No. 08/260,798 filed by the applicant on Jun. 16, 1994 proposes a device for image processing which can accurately identify areas of a dot image and a character image.

In general, an image mainly consisting of line drawings, such as a character image, not only has a distinct boundary between low and high densities but also is composed of continuous edges in which the boundary length continues for two or more picture elements in the same direction. However, an image consisting of dot drawings, such as a dot image, has edges but is rarely composed of continuous edges continuing for two or more picture elements in the same direction. The device for image processing device disclosed in the above application identifies dot images and character images by detecting such continuous edges.

More specifically, a detection circuit for detecting a continuous edge detects a continuous edge, in which a boundary with a large density difference continues for two or more picture elements, from picture signals of picture elements in a primary scanning direction and a secondary scanning direction in an image. The detection circuit for detecting a continuous edge generates a first detection signal when it detects the continuous edge from picture signals of picture elements in the primary scanning direction, and generates a second detection signal when it detects the continuous edge from picture signals of picture elements in the secondary scanning direction. At the generation of at least one of the first and second detection signals, the picture signals are converted into binary signals as a character image. At the generation of neither the first nor second detection signal, the picture signals are converted into binary signals by binary conversion different from that of the first conversion circuit.

SUMMARY OF THE INVENTION

The object of the present invention is to provide a device for image processing by utilizing the image determination method with detection of a continuous edge. The device of the present invention is further improved for the identification of character, dot and photo images.

According to the present invention, an image processing device comprises a picture element extraction circuit for continuously extracting picture signals in a matrix area composed of picture signals corresponding to density of pixels of an image, an area determination circuit for determining whether or not the image in the matrix area is in a photo area, a second area determination circuit for determining whether or not the image in the matrix area is in a dot area, and a third area determination circuit for determining whether or not the image in the matrix area is in a character area by utilizing the results of determination by the first and second determination circuits.

The first area determination circuit determines whether or not the matrix area is the photo area based on the maximum and minimum values of picture signals in the matrix area. The second area determination circuit detects the continuous edge from picture signals of picture elements in the primary scanning direction and the secondary scanning direction in the matrix area. When the continuous edge is detected either in the primary or secondary scanning direction, the second area determination circuit determines the matrix area to be a character area. When it is not detected, the circuit determines the matrix area to an area other than the character area. The third area determination circuit detects plurality of results of determination by the first and second area determination circuits, and determines whether the matrix area is a character area or another area based on the plurality of results of determination.

More specifically, the third area determination circuit composes a second matrix based on a signal representing the result of determination on the photo area from the first area determination circuit, and first and second signals representing the result of determination for the character area and dot area, respectively, from the second area determination circuit, and generates a third signal representing the character area and a fourth signal representing an area other than the character area depending on the signal pattern in the second matrix area.

Since the present invention determines the character area from the result of determination on the periphery of the matrix area by utilizing the first, second and third area determination circuits, it is possible to enhance the accuracy on identification for the character area or another area. The picture signals in the matrix area used by the first area determination circuit are not necessarily to fully match the picture signals in the matrix area used by the second area determination circuit. However, the picture signals for picture element of interest are commonly used.

According to the present invention, outputs from the first and third area determination circuit are subject to two binary conversion. A first binary conversion circuit converts the picture signals extracted by the picture element extraction circuit into binary signals based on the result of determination as the character area by the third area determination circuit. In addition, a second binary conversion circuit converts the picture signals extracted by the picture element extraction circuit into binary signals by binary conversion different from the that of the first binary conversion circuit based on the result of determination as the photo area by the first area determination circuit or the result of determination as an area other than the character area by the third area determination circuit. Thus, most suitable binary conversion is performed for an image area.

BRIEF DESCRIPTION OF THE DRAWINGS

The above object and features and advantages of the present invention will become more apparent from the following detailed description taken the accompanying drawings in which.

DETAILED DESCRIPTION OF THE PREFERRED EMBODIMENT

Figure 1:
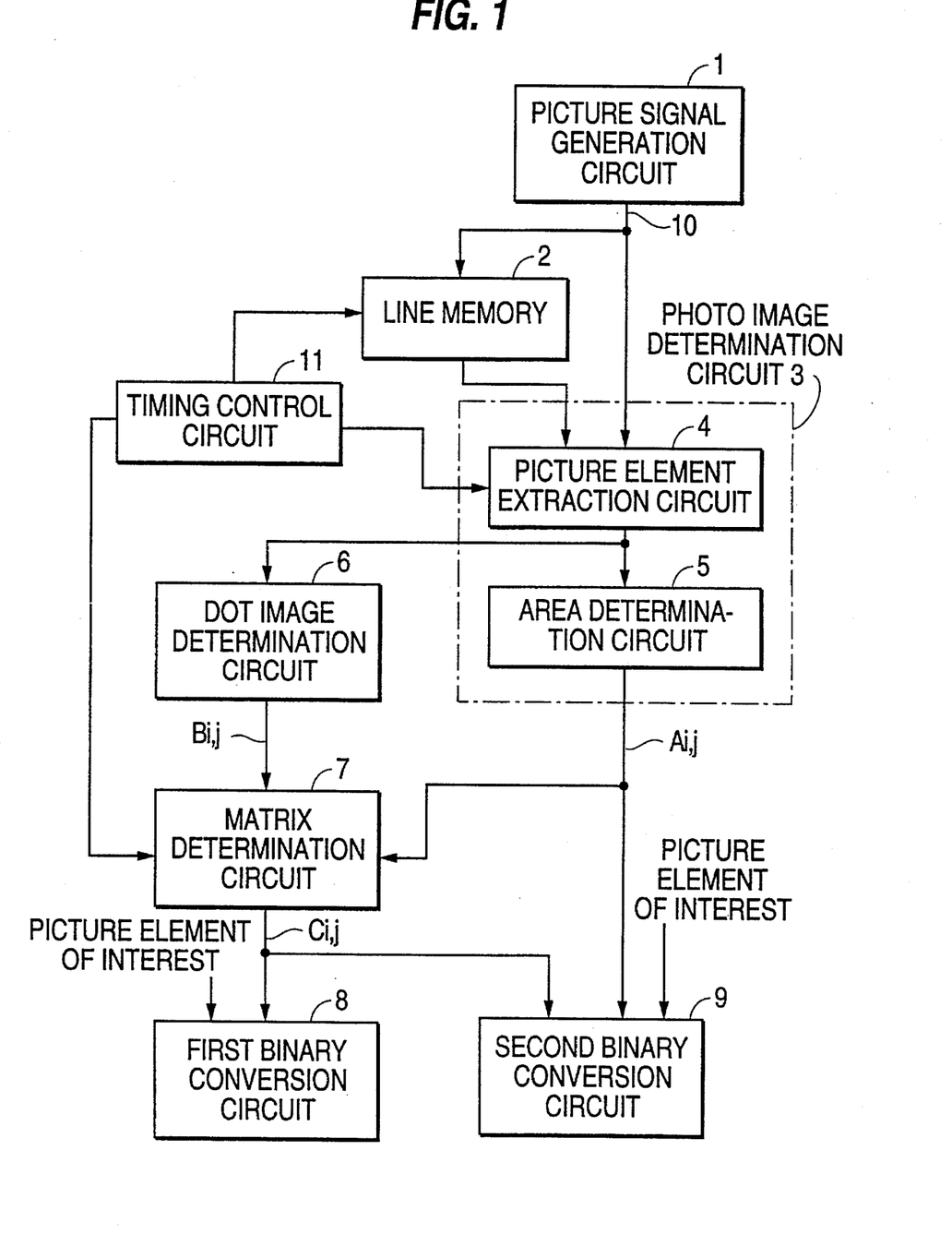
FIG. 1 is a block diagram illustrating the image processing device of an embodiment of the present invention.

Referring now to FIG. 1, the image processing device of an embodiment according to the present invention comprises a picture signal generation circuit 1 for generating a picture signal, a line memory 2, a photo image determination circuit 3 for detecting an image area and determining whether the image area is a photo area or a provisional character area, a dot image determination circuit 6 for determining whether or not an image area is a provisional dot area, a matrix determination circuit 7 for composing a matrix based on outputs from the photo image determination circuit 3 and the dot image determination circuit 6 and determining whether the area is a dot area or a character area, a first binary conversion circuit 8 corresponding to binary conversion of the character area, a second binary conversion circuit 9 for performing binary conversion by an error distribution method on an image which is determined as in a dot or photo area, and a timing control circuit 11.

The picture signal generation circuit 1 generates a picture signal corresponding to the density of a picture element by scanning an original document with an image sensor, converts it into a digital signal, and outputs multivalue digital picture signal (hereinafter called the "picture signal") 10. For example, when the picture signal has 256 tones, it is an 8-bit multivalue digital signal. The size of one picture element is 0.125 mm/dot.

The line memory 2 stores the picture signals for one scan line, and, when it becomes full, outputs the stored picture signals in the sequence of input. The line memory may be replaced with a shift register. Writing to and reading from the line memory 2 (or, signal transfer of the shift register) are controlled by the timing control circuit 11.

The picture signals from the line memory 2 and the picture signal generation circuit 1 are supplied to the photo image determination circuit 3. The photo image determination circuit 3 composes a 2×2 matrix which is a detection area (a first matrix), and determines whether the matrix is the photo area or provisional character area. The photo image determination circuit 3 has a picture element extraction circuit 4 and an area determination circuit 5.

Figure 2:
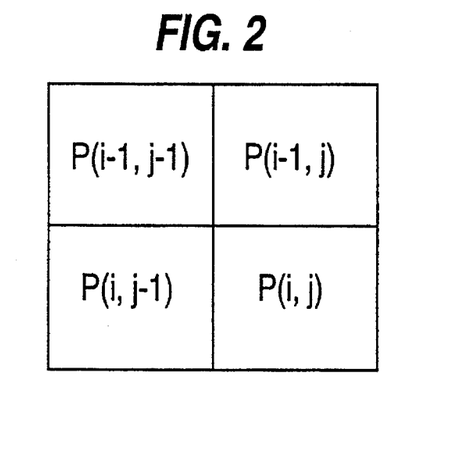
FIG. 2 is a matrix of picture elements extracted by a picture element extraction circuit

The picture element extraction circuit 4 continuously extracts and stores picture elements in the 2×2 square matrix. The matrix is composed of the picture element of interest to be converted into binary and the three adjacent reference picture elements based on the picture signals from the picture signal generation circuit 1 and the line memory 2. FIG. 2 shows a matrix of picture elements extracted by the picture element extraction circuit 4, in which p (i–1, j–1) and p (i–1, j) are picture elements or their picture signals of one line before, from the line memory 2, and p (i, j–1) and p (i, j) are picture elements of the picture signal 10 or their picture signals. The picture element of interest is the newest picture element p (i, j) in the matrix, and all others are reference picture elements. Here, i represents the line number in the primary scanning direction, while j represents the column number in the secondary scanning direction. Writing and reading of the picture signal to and from the picture element extraction circuit are controlled by the timing control circuit 11.

The area determination circuit 5 detects the picture signals in the matrix shown in FIG. 2 extracted by the picture element extraction circuit 4, and calculates difference between the maximum value pMAX and the minimum value pMIN of density of the picture signals in the matrix. Furthermore, the area determination circuit 4 compares the difference with a density threshold Th, and determines whether the matrix of FIG. 2 is in a photo area or a character area based on the following formula (1).

$$p\,MAX - p\,MIN < Th \tag{1}$$

A photo area is of half tone and has small variation in the density, while a character area is of a black and white image and has large variation in the density. Therefore, if the formula (1) is satisfied, the area determination circuit 4 generates a determination output $A_{i,j}=1$ representing the photo area. If not, the area determination circuit 4 generates a determination output $A_{i,j}=0$ representing the provisional character area. The determination output $A_{i,j}$ is supplied to the matrix determination circuit 7 and the second binary conversion circuit 9.

If $A_{i,j}=1$, for the 2×2 matrix determined as the photo area by the photo image determination circuit 3, the picture signal of the picture element of interest is converted into binary signals by the second binary conversion circuit 9. On the other hand, if $A_{i,j}=0$, the second binary conversion circuit 9 does not convert the picture signal of the picture element of interest, or the picture signal of the picture element of interest is not supplied to the second binary conversion circuit 9. The 2×2 matrix determined as the provisional character area by the photo image determination circuit 3 may be a normal character image area or dot image area because the dot area does not satisfy the formula (1) frequently. Therefore, if $A_{i,j}=0$, the embodiment of the present invention does not immediately determine such area as a character area, but first identifies whether it is a character area or a dot area.

Figures 3A, 3D:
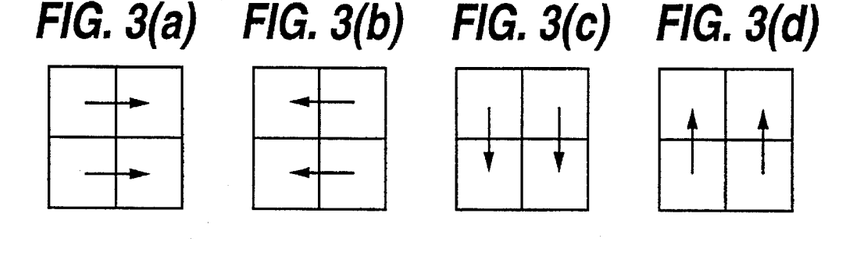
FIG. 3 is density gradient patterns for detecting a continuous edge.

The dot image determination circuit 6 detects a continuous edge on a boundary between black and white picture elements in the primary and secondary scanning directions for the 2×2 matrix stored in the picture element extraction circuit 4. Since a dot image generally has a characteristic that the continuous edge is hardly detected, the dot image determination circuit 6 utilizes this characteristic. The continuous edge is detected from one of four density gradient patterns (a) to (d) as shown in FIG. 3. Arrows shown in FIG. 3 represent directions changing from a black picture element to a white picture element. The dot image determination circuit 6 detects respective density gradient patterns from the following calculation:

$$p(i-1, j-1) - p(i-1, j) \geq Thx \tag{2},$$

and $$p(i, j-1) - p(i, j) \geq Thx \tag{3}$$

or $$p(i-1, j-1) - p(i-1, j) \leq Thx \tag{4},$$

and $$p(i, j-1) - p(i, j) \leq -Thx \tag{5}$$

or $$p(i-1, j-1) - p(i, j-) \geq Thy \tag{6},$$

and $$p(i-1, j) - p(i, j) \geq Thy \tag{7}$$

or $$p(i-1, j-1) - p(i, j-1) \leq -Thy \tag{8},$$

and $$p(i-1, j) - p(i, j) \leq -Thy \tag{9}$$

Assuming that the formulas (2) and (3) constitute condition 1, the formulas (4) and (5) constitute condition 2, the formulas (6) and (7) constitute condition 3, and the formulas (8) and (9) constitute condition 4, the conditions 1 to 4 correspond to the density gradient patterns (a) to (d), respectively. Thx and Thy are density gradient determination thresholds in the primary and secondary scanning directions, respectively.

The dot image determination circuit 6 determines the 2×2 matrix area of FIG. 2 as a character area when at least one of the conditions 1 to 4 is satisfied, and generates a determination result $B_{i,j}=0$ as a first signal. When all conditions are not satisfied, the dot image determination circuit 6 determines it as a dot area, and generates a determination result $B_{i,j}=1$ as a second signal.

The matrix determination circuit 7 detects plurality of results of determination on the peripheral area of the 2×2 matrix of FIG. 2, from the photo image determination circuit 3 and the dot image determination circuit 6, and determines whether the matrix area is a character area or another area from the results of determination.

Figure 4:
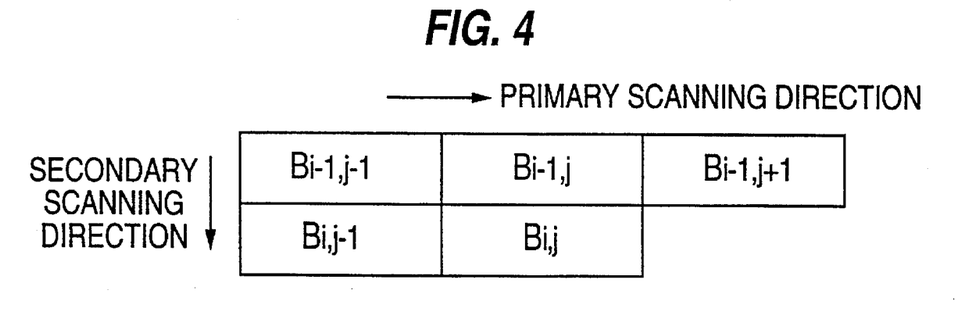
FIG. 4 is a matrix composed by a matrix determination circuit.

More specifically, the matrix determination circuit 7 sequentially stores the result of determination $B_{i,j}$ from the dot image determination circuit 6 and the determination $A_{i,j}=1$ when the image is determined as the photo image by the photo image determination circuit 3, and extracts the second matrix shown in FIG. 4 from the stored results of determination. However, FIG. 4 does not show $A_{i,j}$, and only shows data relating to $B_{i,j}$. The second matrix of FIG. 4 consists of the result of determination $B_{i,j}$ from the dot image determination circuit 6, and four older results of determination $B_{i-1,j-1}$, $B_{i-1,j}$, $B_{i-1,j+1}$, and $B_{i,j-1}$. The older results of determination in the matrix of FIG. 2 are not restricted to four, but may be more than that.

When the provisional character area is determined by the photo image determination circuit 3 and $A_{i,j}=0$ is supplied to the matrix determination circuit 7, it stores the result of the determination $B_{i,j}$. Then, if the result of determination on the matrix of FIG. 4 contains at least one 0, the matrix determination circuit 7 determines the provisional character area in the matrix of FIG. 2 as a character area, and generates a result of determination $C_{i,j}=0$ as a third signal. Furthermore, for $A_{i,j}=0$, if all results of determination on the matrix of FIG. 4 are 1, the matrix determination circuit 7 determines the provisional character area as the dot area, and generates a result of determination $C_{i,j}=1$ as a fourth signal.

When the photo image area is determined by the photo image determination circuit 3 and $A_{i,j}=1$ is supplied, data of 1 or data of $A_{i,j}$ is stored in the matrix of FIG. 4. In this case, the matrix determination circuit 7 generates the result of determination $C_{i,j}=1$ without detecting the content of the second matrix.

The matrix determination circuit 7 enhances accuracy of the result of determination by the dot image determination circuit 6 so that stable area determination can be attained.

If $C_{i,j}=0$, the first binary conversion circuit 8 converts the picture signal p (i, j) of the picture element of interest into binary signals with binary conversion suitable for the character image, while, if $C_{i,j}=1$, the second binary conversion circuit 9 converts the picture signal p (i, j) into binary signals with the error distribution method. The picture signal extracted and stored by the picture element extraction circuit 4 is utilized as the picture signal p (i, j) for each binary conversion circuit.

It is necessary to store the 2×2 matrix in the picture element extraction circuit 4 during operation of the area determination circuit 5 and during operation of the dot image determination circuit 6, but not necessary to store the matrix during operation of the first and second binary conversion circuits 8 and 9. In this case, it may be possible to provide a register for reading and storing only the picture element of interest p (i, j) from the picture element extraction circuit 4 and supplying it to each binary conversion circuit.

In the image processing device described above, while the photo image determination circuit 3, the dot image determination circuit 6 and the matrix determination circuit 7 may be constituted by a computer circuit using a CPU, these circuits may be arranged by other hardware.

Figure 5:
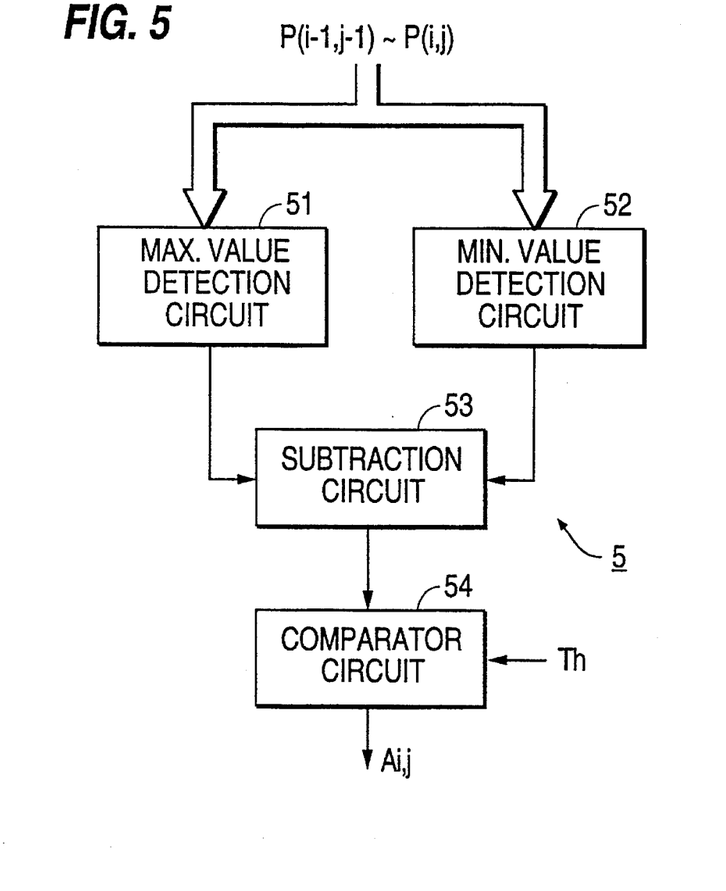
FIG. 5 is a circuit diagram illustrating an area determination circuit used for the embodiment of the present invention.

FIG. 5 is a detailed circuit diagram illustrating the area determination circuit 5 in the photo image determination circuit 3 in FIG. 1. In the Figure, a maximum value detection circuit 51 and a minimum value detection circuit 52 detect the maximum value pMAX and the minimum value pMIN of the picture signals p (i−1, j−1), p (i−1, j), p (i, j−1), and p (i, j) of the 2×2 matrix from the picture element extraction circuit 4, respectively. A subtraction circuit 53 subtracts the minimum value pMIN from the maximum value pMAX. A comparator circuit 54 compares the subtracted value with the threshold Th to determine whether or not the formula (1) is satisfied. The comparator circuit 54 generates the first output Ai, j described earlier.

Figure 6:
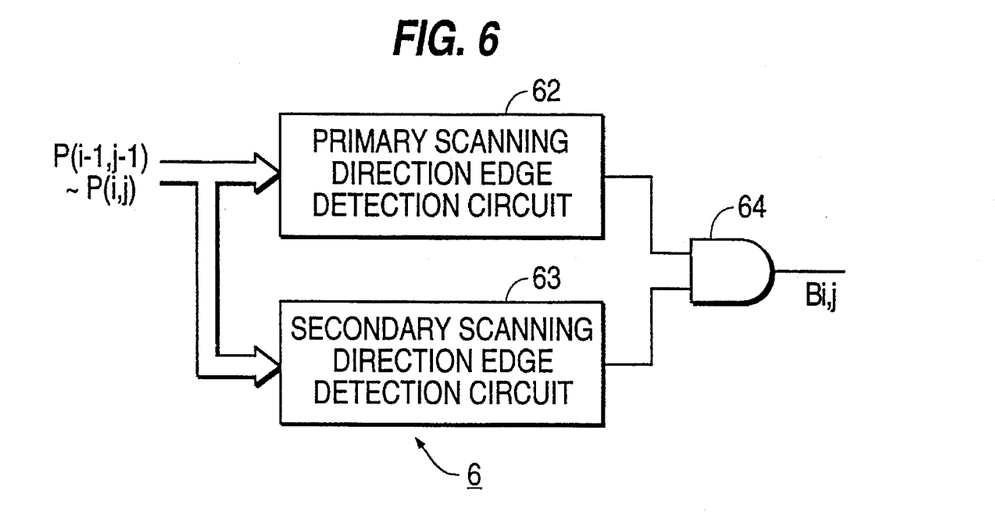
FIG. 6 is a circuit diagram illustrating a dot image determination circuit used for the embodiment of the present invention.

FIG. 6 is a circuit diagram illustrating the dot image determination circuit 6 in FIG. 1. In the Figure, four picture signals from the picture element extraction circuit 4 are supplied to a primary scanning direction edge detection circuit 62 and a secondary scanning direction edge detection circuit 63.

The primary scanning direction edge detection circuit 62 detects difference between picture signals of adjacent picture elements with two vectors in the primary scanning direction for the 2×2 matrix (the patterns (a) and (b) in FIG. 3), and determines that there is the continuous edge if the absolute values of two detected difference signals are larger than the determination threshold Thx. In this case, the condition 1 or 2 of the above-mentioned formulas (2) to (5) is established, and an output 0 is generated. If both the conditions 1 and 2 are not established, the primary scanning direction edge detection circuit 62 generates an output 1. The secondary scanning direction edge detection circuit 63 detects difference between picture signals of adjacent picture elements with two vectors in the secondary scanning direction for the 2×2 matrix (the patterns (c) and (d) in FIG. 3), and determines that there is the continuous edge if the absolute values of two detected difference signals are larger than the determination threshold Thy. In this case, the condition 3 or 4 of the above-mentioned formulas (6) to (9) is established, and an output 0 is generated. If both the conditions 3 and 4 are not established, the secondary scanning direction edge detection circuit 63 generates an output 1. An AND gate 64 receives the outputs of the primary scanning direction edge detection circuit 62 and the secondary scanning direction edge detection circuit 63, and outputs a result of determination Bi, j.

Figure 7:
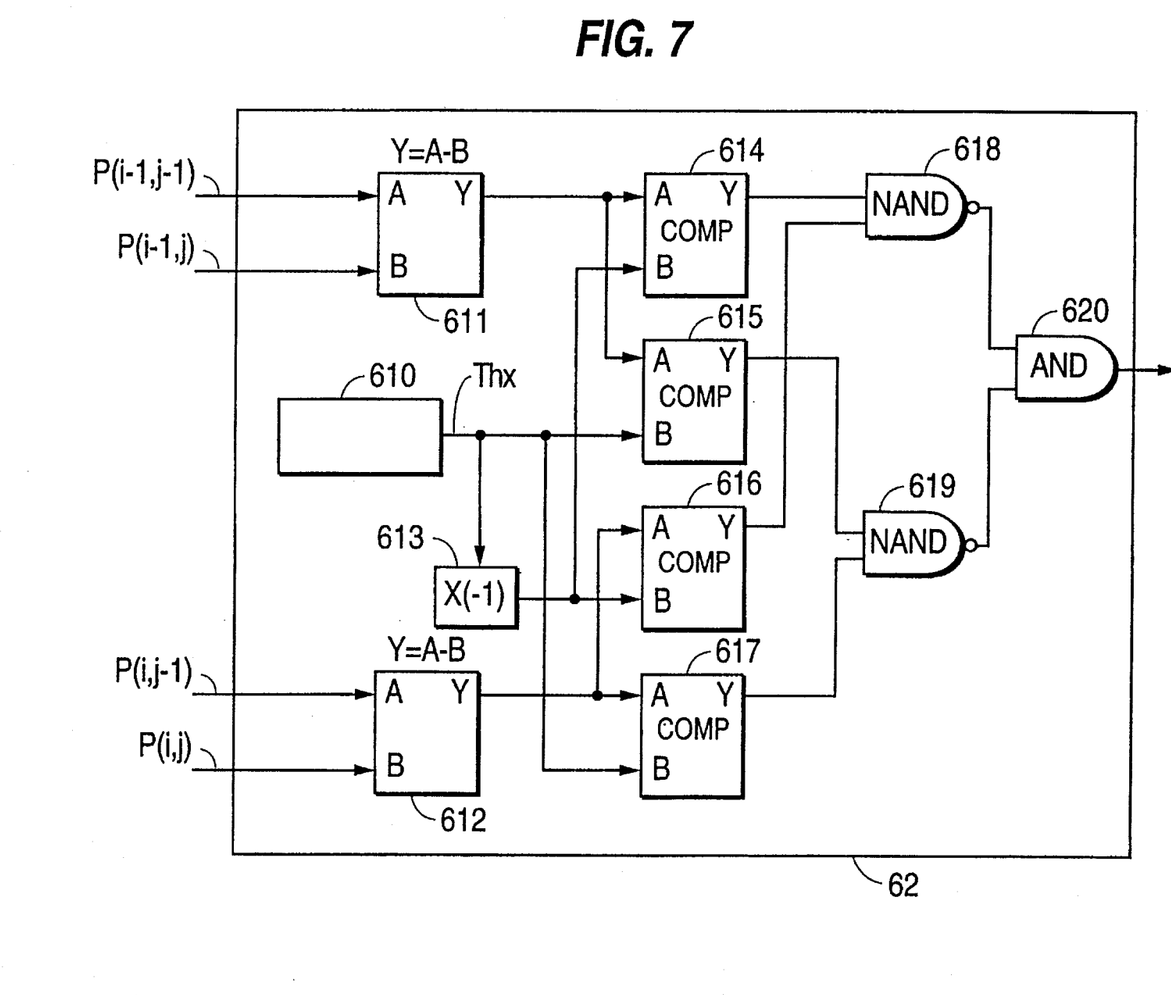
FIG. 7 is a detailed circuit diagram illustrating a primary scanning direction edge detection circuit in the dot image determination circuit shown in FIG. 6.

FIG. 7 is a detailed circuit diagram of the primary scanning direction edge detection circuit 62. In the FIG., a subtraction circuit 611 is supplied with the picture signals p (i−1, j−1) and p (i−1, j), performs subtraction for the left side of the formula (2), and outputs a difference signal. A subtraction circuit 612 is supplied with the picture signals p (i, j−1) and p (i, j), performs subtraction for the left side of the formula (3), and outputs a difference signal. The difference signal from the subtraction circuit 611 is supplied to comparators 614 and 615, and the difference signal from the subtraction circuit 612 is supplied to comparators 616 and 617.

A reference value generator circuit 610 generates a reference value Thx, which is, in turn, supplied to the comparators 615 and 617. A sign inversion circuit 613 inverts the sign of the reference value Thx, and the reference value −Thx is supplied to the comparators 612 and 616. Therefore, each of the comparators 615 and 617 compares the left and right sides of formulas (2) and (3). If each comparator finds formulas (2) and (3) to be satisfied, its output Y becomes 1. Otherwise, it is 0. Each of the comparators 614 and 616 compares the left and right sides of formulas (4) and (5). If each comparator finds formulas (4) and (5) to be satisfied, its output Y becomes 1. Otherwise, it is 0.

A NAND gate 619 receives the output of comparators 615 and 617, and outputs 0 if formulas (2) and (3) are simultaneously established, A NAND gate 618 receives the output of comparators 614 and 616, and outputs 0 if formulas (3) and (4) are simultaneously established. When at least one of the outputs of the NAND gates 618 and 619 is 0, an AND gate 620 outputs a first detection signal of 0.

Therefore, the first detection signal from the AND gate 620 becomes 0 if the continuous edge is detected in either pattern (a) or (b), and becomes 1 if the continuous edge is not detected.

Figure 8:
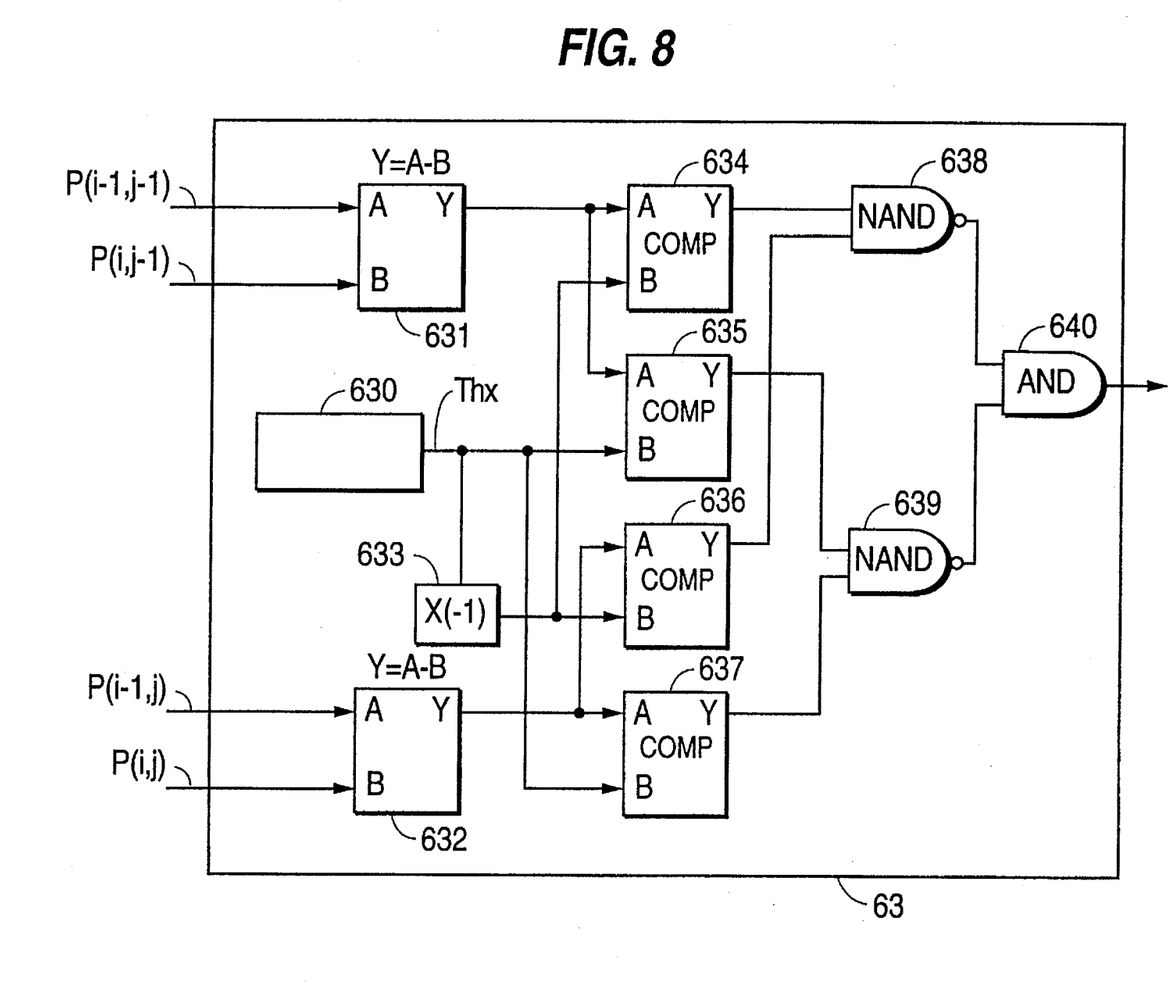
FIG. 8 is a detailed circuit diagram illustrating a secondary scanning direction edge detection circuit in the dot image determination circuit shown in FIG. 6.

FIG. 8 is a detailed circuit diagram of the secondary scanning direction edge detection circuit 63. It has the same circuit configuration as the primary scanning direction edge detection circuit 62. The picture signals p (i−1, j−1) and p (i, j−1) are supplied to a subtraction circuit 631, while the picture signals p (i−1, j) and p (i, j) are supplied to a subtraction circuit 632. Then, the operations of a reference value generation circuit 630, a sign inversion circuit 633, comparators 634, 635, 636, 637, NAND gates 638, 639, and AND gate 640 are the same as those of corresponding circuits in the primary scanning direction edge detection circuit 62.

Therefore, a second detection signal from the AND gate 640 becomes 0 if the continuous edge is detected in either pattern (c) or (d), and becomes 1 if the continuous edge is not detected.

Figure 9:
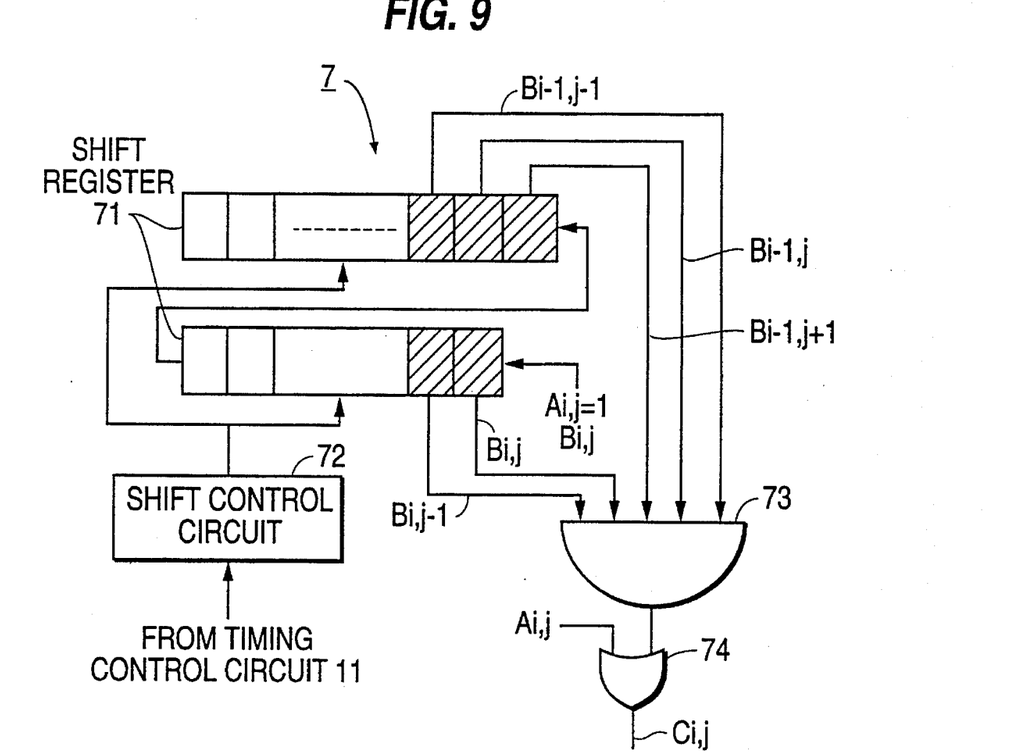
FIG. 9 is a circuit diagram illustrating a matrix determination circuit used for the embodiment of the present invention.

FIG. 9 is a circuit diagram illustrating the matrix determination circuit 7 in FIG. 1. In the figure, a register 71 sequentially stores the result of determination from the dot image determination circuit 6 and Ai, j=1. The signal for Ai, j=0 when a photo area is determined is not stored. The register 71 stores the result of determination for two lines, and shifts to the left in the figure sequentially with a shift pulse from a shift control circuit 72. The shift control circuit 72 generates a shift pulse in synchronization with a control signal from the timing control circuit 11. An AND gate 73 receives as its input the results of determination Bi−1, j−1, Bi−1, j, Bi−1, j+1, Bi, j−1 and Bi, j stored in five storage bits at the shaded area in FIG. 9 of the register 71, and supplies its output to an OR gate 74 which, in turn, generates a third signal Ci, j from Ai, j and the output of the AND gate 73. If Ai, j=1, or if all of five results of determination supplied to the AND gate 73 are 1, Ci, j=1, and the matrix of FIG. 2 is determined as the photo or dot area. If A1, j=0 and at least one of five results of determination is 0, Ci, j=0, and the matrix of FIG. 2 is finally determined as the character area.

For Ci, j=0, the first binary conversion circuit 8 converts the picture signal p (i, j) of the picture element of interest into binary signals, while, for Ai, j=1 or Ci, j=1, the second binary conversion circuit 9 converts the picture signal p (i, j) of the picture element of interest with the error distribution method. It is actually desirable that one of the outputs from the first and second binary conversion circuits 8 and 9 is selected by a selection circuit shown in FIG. 10.

Figure 10:
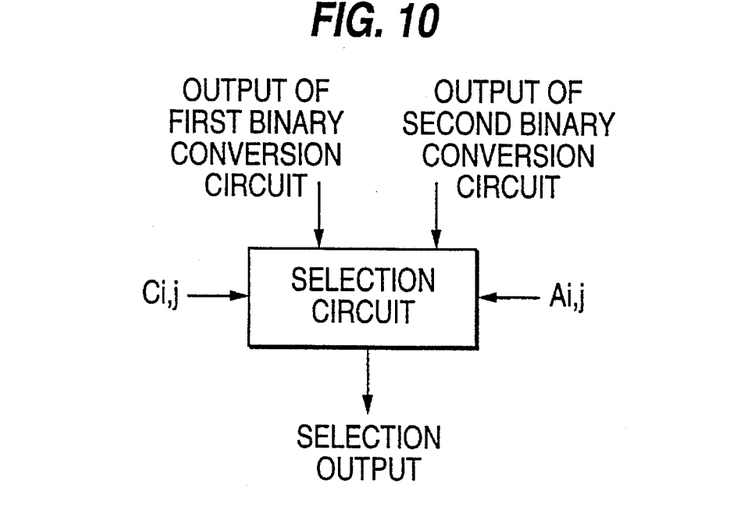
FIG. 10 is a circuit diagram illustrating a selection circuit used for the embodiment of the present invention.

Referring to FIG. 10, a selection circuit 10 selects one of the outputs from the first and second binary conversion circuits 8 and 9 depending on the first output Ai, j from the photo image determination circuit 3 and the third output Ci, j from the matrix determination circuit 7. That is, the selection circuit 10 selects the output of the first binary conversion circuit 8 if Ci, j=0, and selects the output of the second binary conversion circuit 9 if Ai, j=1 or Ci, j=1.

The image processing device according to the present invention is not limited to the embodiment described above. For example, the picture element extraction circuit 4 may be separated from the photo image determination circuit 3. In addition, although the picture element extraction circuit 4 is arranged to extract picture signals from a 2×2 matrix, it may be arranged to extract such signals from a matrix with other size. In such case, the dot image determination circuit 6 may be not necessarily to use for determination of an area all picture signals utilized by the area determination circuit 5 in the photo image determination circuit 3. That is, while the area determination circuit 5 may use a matrix of, for example, 3×2, the dot area determination circuit 6 may use a 2×2 matrix containing a picture element of interest in the 3×2 matrix.

Furthermore, although, in the image processing device of FIG. 1, the area determination circuit 5 in the photo image determination circuit 3 and the dot image determination circuit 6 operate in parallel, the dot image determination circuit 6 may perform the area determination processing only on a 2×2 matrix which is determined as a character candidate area by the photo image determination circuit 3.

What is claimed is:

1. An image processing device for separating areas in an image in which character, dot and photo images are mixed comprising:

first determination means being supplied with picture signals representing an image, which contains a character, dot and photo, with multivalue data on picture element basis, for detecting the maximum and minimum values of the picture elements in a first matrix with a plurality of picture elements, and for determining whether said first matrix is a photo area or a provisional character area on the picture element basis according to result of comparison between said difference and a threshold;

second determination means for determining by using a second matrix with a plurality of picture elements, which partially overlaps said first matrix, whether or not variation of picture elements in said second matrix exceeds a predetermined amount; and, means for determining said provisional character area as a character area and dot/photo area by a third matrix which is composed by using result of determination by said second determination means.

2. The image processing device according to claim 1, wherein said first determination means generates a first determination output for said first matrix of a photo area when the following formula is satisfied by using the difference between the maximum value pMAX and the minimum value pMIN of picture elements in said first mtraix and a threshold Th, $$p\,MAX - p\,MIN < Th,$$

and, otherwise, generates a second determination output.

3. The image processing device according to claim 2, wherein each of, said first and second matrices is a 2×2 matrix.

4. The image processing device according to claim 1, wherein said second determination means includes means for detecting a continuous edge in which a boundary with a large density difference continues for two or more picture elements in a primary scanning direction and secondary scanning direction in said second matrix, and means for generating a determination result indicating whether said continuous edge is detected from at least one of said primary and secondary scanning directions.

\* \* \* \* \*